United States Patent [19]

Moon

[11] Patent Number: 5,517,677
[45] Date of Patent: May 14, 1996

[54] ADAPTIVE WEIGHTING OF A SCANNING SEQUENCE

[75] Inventor: Billy G. Moon, Southlake, Tex.

[73] Assignee: Uniden America Corporation, Fort Worth, Tex.

[21] Appl. No.: 61,578

[22] Filed: May 13, 1993

[51] Int. Cl.⁶ .................................................. H04B 7/26
[52] U.S. Cl. ...................... 455/161.1; 455/33.1; 455/54.1
[58] Field of Search .................................. 455/33.1–33.4, 455/34.1, 34.2, 54.1, 54.2, 56.1, 161.1, 161.2, 161.3; 379/59, 60

[56] References Cited

U.S. PATENT DOCUMENTS

| | | | |
|---|---|---|---|
| Re. 32,789 | 11/1988 | Lynk, Jr. et al. | 379/58 |
| 4,114,104 | 9/1978 | Denzene | 325/470 |
| 4,144,409 | 3/1979 | Utano et al. | 179/2 EB |
| 4,179,661 | 12/1979 | Harris et al. | 325/455 |
| 4,276,651 | 6/1981 | Bench et al. | 375/120 |
| 4,347,625 | 8/1982 | Williams | 455/17 |
| 4,347,626 | 8/1982 | Wenzel | 455/18 |
| 4,352,955 | 10/1982 | Kai et al. | 179/2 EB |
| 4,466,125 | 8/1984 | Kanayama | 455/56 |
| 4,550,443 | 10/1985 | Freeburg | 455/33 |
| 4,597,105 | 6/1986 | Freeburg | 455/33 |
| 4,649,567 | 3/1987 | Childress | 455/17 |
| 4,654,879 | 3/1987 | Goldman et al. | 455/33 |
| 4,723,264 | 2/1988 | Sasuta et al. | 379/58 |
| 4,742,560 | 5/1988 | Arai | 455/33 |
| 4,744,101 | 5/1988 | Saegusa | 379/61 |
| 4,747,101 | 5/1988 | Akaiwa et al. | 370/95 |
| 4,759,051 | 7/1988 | Han | 379/59 |
| 4,905,301 | 2/1990 | Krolopp et al. | 455/34.1 |
| 4,907,290 | 3/1990 | Crompton | 455/56 |
| 4,914,651 | 4/1990 | Lusignan | 370/69.1 |
| 4,939,746 | 7/1990 | Childress | 455/54.2 |
| 5,189,413 | 2/1993 | Gaskill et al. | 455/161.1 |
| 5,214,789 | 5/1993 | George | 455/33.2 |

Primary Examiner—Reinhard J. Eisenzopf
Assistant Examiner—Thanh Le
Attorney, Agent, or Firm—Richards, Medlock & Andrews

[57] ABSTRACT

A scanning technique that is preferential as to communication channels actually utilized in the past. A programmable queue is written with a communication channel identity code based on a predefined criteria, such as each time the channel is actually used. The preferential queue is scanned in association with all the remaining communication channel identity codes, thereby providing a weighting factor that is skewed toward the selection of channels that have experienced actual use. System identification codes utilized in a mobile radio complex are stored in the queue in accordance with a roaming function, and group identity codes are stored in the queue when scanning home channels of mobile radio systems to determine incoming calls.

35 Claims, 4 Drawing Sheets

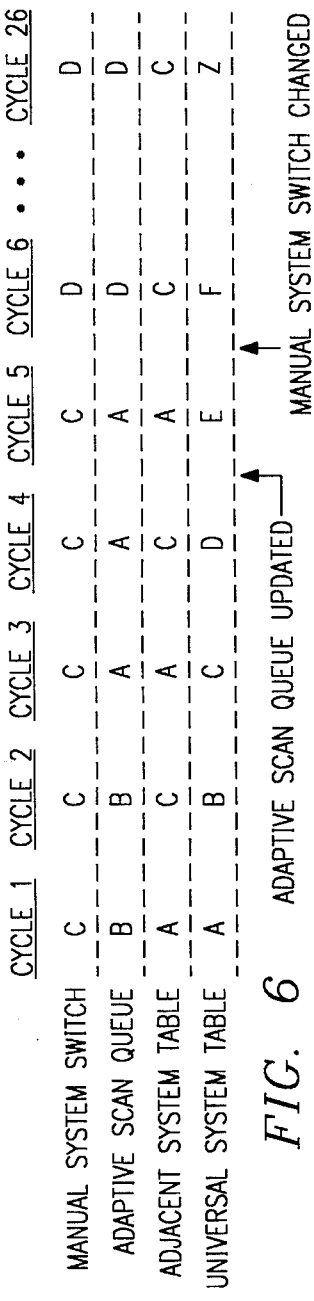
FIG. 6
| | CYCLE 1 | CYCLE 2 | CYCLE 3 | CYCLE 4 | CYCLE 5 | CYCLE 6 | ... | CYCLE 26 |
|---|---|---|---|---|---|---|---|---|
| MANUAL SYSTEM SWITCH | C | C | C | C | C | D | | D |
| ADAPTIVE SCAN QUEUE | B | B | A | A | A | D | | D |
| ADJACENT SYSTEM TABLE | A | C | A | C | A | C | | C |
| UNIVERSAL SYSTEM TABLE | A | B | C | D | E | F | | Z |
↑ ADAPTIVE SCAN QUEUE UPDATED    ↑ MANUAL SYSTEM SWITCH CHANGED
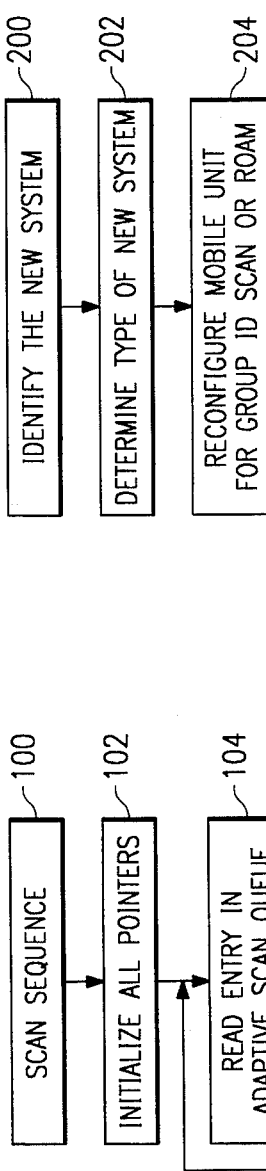
FIG. 8
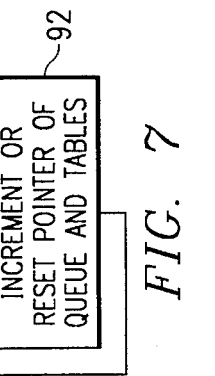
FIG. 7
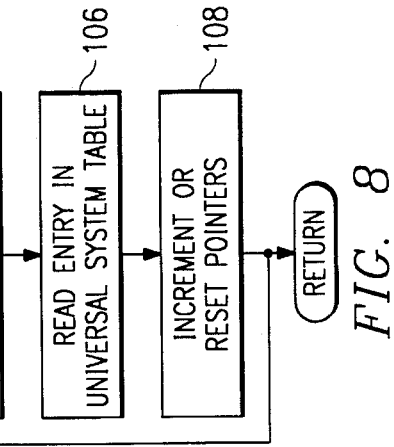
FIG. 11
| SYSTEM | TYPE |
|---|---|
| SYSTEM A ID | 0 |
| SYSTEM B ID | 0 |
| SYSTEM C ID | 1 |
| ... | |
FIG. 12

5,517,677

ADAPTIVE WEIGHTING OF A SCANNING SEQUENCE

TECHNICAL FIELD OF THE INVENTION

The present invention relates in general to apparatus and methods for weighting a selection process, and more particularly to a communication system where the selection process comprises a scanning sequence that is modified or weighted based on past history events that have occurred and are more likely to reoccur. In a more narrow application, the invention relates to the modification of a mobile radio sequential scanning process that inserts into the scanning sequence mobile radio station identities that have actually been encountered in the past, thereby allowing those stations to either be scanned early in the sequence or to be scanned plural times in a single cycle of the scanning sequence.

BACKGROUND OF THE INVENTION

In the recent past, a significant advancement has been achieved in the development of mobile radios and mobile telephones. As a result, all types of vehicles can be equipped with mobile communication equipment to allow persons to remain in voice or data contact with others when traveling from one location to a different location. In the early development of mobile communication equipment, mobile radios, and the like, were adapted for communicating with a single station (e.g., cell or site), as that system was often the only system in the particular geographical area of operation. A mobile radio station of this type could operate on a number of different communication channels, where each channel was associated with a different transmit and receive frequency in the 800–900 megahertz spectrum.

Initially, the radio channels of a system were dedicated to particular users and could not be used, even when idle, with other users. The trunking of mobile radio channels was developed so that each user of a system could communicate on any of the channels, if a channel was idle when communications were desired. While the trunking of communication channels greatly facilitated the efficiency and the use of communications, the technique created other problems. For example, in a trunked radio system, a mobile radio is required to scan the various channels to determine if an incoming call is directed to that particular radio. Further developments in the mobile radio field led to the use of a "home" channel that was dedicated for transmitting data messages to the various mobile radios to signal when an incoming call is designated to a particular mobile radio. In this type of arrangement, when the mobile radios were turned on and in an idle mode, the radio would automatically monitor the home channel for data messages to determine if any incoming call was directed to that particular mobile radio. The different mobile radios are distinguished from each other in this type of system by assigning a unique identification code to each mobile radio. The data message transmitted on the home channel by the central system would include the particular identification code assigned to a particular radio if an incoming call was intended to be completed to that mobile radio. Hence, each mobile radio had to monitor the home channel, retrieve all of the identification codes and compare them with the unique identification code assigned to the radio. If a match was found, then the mobile radio would automatically respond, and the system controller would switch from the home channel to an idle voice communication channel, whereby voice communications could be carried out.

As the demand for mobile communications increased, the number of central systems also increased. Presently, there may be numerous systems in a single locale of operation. Generally, each mobile radio is allowed to operate with a particular system by way of license or other contractual arrangement. Further, each system controller has programmed therein the identification code of the system itself, as well as the codes of the various radios allowed to operate therewith. In situations where adjacent systems do not overlap in terms of area of transmission coverage, the systems can operate with the same channel frequencies. On the other hand, if there is an overlapping coverage between adjacent systems, the channel frequencies cannot be the same as there would be interference between the same channels.

The use of multiple stations in an area of operation greatly facilitates the area by which the mobile radio user can communicate, however, other problems are presented. For example, a mobile radio operating in a multi-system area must scan the various systems, and particularly the home channel of each authorized system and compare the various identification codes to determine if an incoming call is intended for the mobile radio. The data message in which the code is embedded is generally about 134 milliseconds long. The number of systems by which a mobile radio can operate is generally limited by the circuits of the mobile radio itself, and is often limited to 10 systems and 10 groups within each system. The scanning by a mobile radio between different systems has traditionally been carried out in a sequential manner starting with system 1 and proceeding through system 10, and then repeating the sequence. The switching between the home channel of one system and the home channel of another system is generally accomplished by use of a frequency synthesizer in the mobile radio. The change of frequency and the detection of the carrier in a mobile radio takes a certain amount of time. Further, the mobile radio must detect and receive the data message on the selected home channel, and usually detect two data messages to ascertain with a high degree of certainty that the data message is valid. Next, the mobile radio must decode and match the identification code received in the data message of the home channel with the unique identification code programmed into the mobile radio. If a match is not found, then the mobile radio must reprogram the frequency synthesizer, proceed to the next home channel of the next system in the sequence. Conventional mobile radios generally take about ¼–½ second in order to scan and check each system home channel to determine if an ID code match exists. It can be appreciated that when a number of systems are to be scanned, a substantial amount of time is required. Further, the longer the time between scans of a particular system, the higher probability that the mobile radio will not presently be scanning a home channel in which there is transmitted the identification code of the mobile radio itself.

Once communications are established between a mobile radio and an originating destination, the actual communications occur in a piecemeal manner, in that there are pauses and gaps between the voice communications of the two parties. In these pauses and gaps between the voice communication, the channel can be seized and used for communications between two other parties. Thus, the foregoing scanning sequence may be required to be carried out numerous times for seizing a communication channel during a single conversation if a programmed dwell time is exceeded. Further, if the routine communications generally occur on systems that appear late in the scanning sequence, time is unnecessarily taken to scan the stations early in the sequence in order to access the stations where there is a higher likelihood of establishing communications.

While the trunking of communication channels has greatly facilitated the use by many users of a few channels, substantial demands are placed on the scanning routine of mobile radios and thus efforts are constantly being made to decrease the scanning time and thus reduce the time intervals for detecting an incoming communication and seizing an available communication channel. Provisions are available in mobile telephone equipment to allow roaming outside the normal cells of operation and yet remain available for receiving incoming calls. This feature is carried out by transferring information to the remote cell where the mobile telephone will be operated. Thus, when an incoming call is generated in the locale of normal operation, it will be transferred to the remote cell and received by the mobile telephone. The "roaming" feature has not yet been established with mobile radios, but such a communication system would be facilitated with the roaming feature. However, both mobile radios and telephones would be enhanced if the roaming feature could be carried out adaptively and transparent to the user so that no overt action is required to receive communications in remote areas of operation.

In view of the foregoing, it can be seen that a need exists for a technique that reduces the scanning time, and thus increases the possibility of achieving a match of ID codes and the seizing of an idle transmission channel. A further need exists for a technique that modifies the conventional scanning sequence so that it is weighted more heavily to increase the likelihood of success early in the scanning sequence. A further need exists for allowing roaming of mobile communication equipment and the automatic "finding" of the mobile equipment and the transferral of incoming communications thereto.

SUMMARY OF THE INVENTION

In accordance with the principles and concepts of the invention, a scanning sequence is modified, or weighted, by repeating certain entries of a scanning sequence so that in the sequential scan, preferred entries of the sequence are accessed plural times in a single scanning cycle. The preferred entries are repeated early in the sequence so that the likelihood of a successful operation or match using the entry is optimized. The entries of the scanning sequence that are repeated are chosen to be those that have been shown in the past to be more frequently used, as compared to the other entries of the sequence. Further, the preferred entries are automatically entered and updated based on the actual occurrences of use.

In the preferred form of the invention, as utilized in mobile communication equipment, the scanning of a number of stations is carried out by utilizing an adaptive queue embedded in the scanning sequence. The adaptive queue is dynamic, in that the entries thereof are continually updated based upon a metric that is shown by past history to be more often used than the other entries of the sequence.

In mobile radio and other applications, various systems are continually scanned by the circuits of the mobile equipment and the unique identification codes of the central systems themselves are automatically written into an adaptive queue or table that is a part of the scan sequence. The adaptive queue is of particular advantage to allow for "roaming" of a mobile radio between different geographical areas. Every time the mobile radio receives a new system identification code in a geographical area where the mobile radio has been taken, the ID code of the system is automatically written into the adaptive queue. The adaptive queue is programmable for holding a few or many entries, and thus can be optimized for the particular geographical route, whether wide range or local roaming, which the mobile radio experiences.

According to the invention, the scan sequence is carried out by scanning the entries of the adaptive queue, whereby the home channels of those systems most frequented by the mobile radio are first selected, followed by the remaining stations with which the mobile radio is programmed to operate. Hence, if a certain station appears plural times in the adaptive queue, it will be selected or scanned more often than the remaining stations. This increases the probabilities of quickly receiving incoming calls in that past experience has shown that the stations in the queue have been more frequently accessed than the other stations. The queue is dynamically updated as every time a new or different station is encountered in the roaming of the mobile equipment, the system identification code is automatically written into the adaptive queue.

The adaptive queue of the invention is maintained in a processor memory of the radio and is updated in a first-in, first-out manner. In other words, new system identification codes are written into the queue and the other codes that have been previously written are shifted in the queue. When the queue becomes full, the oldest identification code is dropped out of the queue for every new ID code written into the queue.

In the preferred form of the invention, the scanning sequence is carried out in a memory hierarchy of system ID codes. The top of hierarchy is the system to which the mobile radio is presently selected, by virtue of a system selection button or knob that is manually selectable by the mobile radio user. Appearing next in the hierarchy is the adaptive queue. Next in the scanning hierarchy is a programmable "adjacent" table having ID codes of systems that are physically or geographically adjacent to the system in which the mobile radio is normally located. For example, if a mobile radio normally operates in a base location with system B, and systems A and C are geographically adjacent to system B, then the ID codes of systems A and C will be programmed into the adjacent table. Lastly, there is programmed into a "universe" table of the mobile radio the identification codes of absolutely all of the systems with which the mobile radio can operate. This table or list is a universe table and will repeat some of the system ID codes that appear in the adjacent table, or the user selection table, or the adaptive queue.

The scanning sequence of the preferred embodiment of the invention is carried out as follows. The particular system is first scanned that is indicated by the switch position of the manual system switch. Then, the first entry of the adaptive queue is scanned. Then, the adjacent system table is accessed and only the first entry programmed therein is scanned. Next, the universal table is accessed and the first entry thereof is scanned. This completes the first scan cycle of the mobile radio. The next scan cycle is carried out by again scanning the system selected by the system switch, and then the second entry is scanned in each of the adaptive queue, the adjacent system table and the universal table. The third scan is carried out by accessing the system switch position and the third entry of the queue and tables. Eventually, through multiple scan cycles of the queue and tables, all of the systems programmed will be scanned, whereupon the scan sequence is repeated again. If the queue or one of the tables becomes completely scanned before the others, the first entry therein is again scanned while the other tables continue to be sequenced. This completes an overall scan sequence, whereupon it is repeated.

During the numerous scanning cycles, the adaptive queue may be automatically updated as the mobile radio encounters a new system, whereupon the new system identification code become automatically integrated into the scanning sequence. Importantly, the system ID codes that have been frequently used in the past are the ones that are first scanned, and if used more frequently than others, will thus be scanned more frequently than others. Accordingly, the likelihood of successfully and quickly completing communications is enhanced.

The foregoing feature of the invention can be incorporated into a telecommunication system in which the mobile radio or telephone continually polls the home channels of systems or cells and measures the signal strength of the carrier signal when a carrier of a home channel becomes weak and another carrier of a different system has a signal strength greater than a specified threshold. The mobile equipment transmits a digital message to the new system and the system returns an acknowledgment of the existence of the mobile equipment in the area covered by the newly encountered system. In receipt of the acknowledgement of the mobile equipment, the system ID code of the new system is automatically written into the programmable queue. In addition, in such an arrangement, the new system has information concerning the whereabouts of the mobile equipment and can thus forward incoming communications directly thereto. The mobile equipment thus does not need to scan group ID codes in such type of system.

While the mobile radio of the invention can be operated with systems allowing roaming, as above noted, other systems may not be so equipped. Thus, the mobile radio can be programmed with data identifying which systems can and which systems cannot provide the roaming handshake between the system and the mobile radio. Thus, when operating with a system not provided with roaming capabilities, the mobile radio can scan the various group ID codes of the system. When the mobile radio is moved and operated with a system providing roaming capabilities, the handshake will be carried out and the group ID scanning will be suppressed.

An adaptive queue of the type noted above can also be utilized in the sequential scanning of group identification codes for mobile radio systems using various groups assigned to each system. Group ID codes can be automatically written into an adaptive queue and scanned in a hierarchy, together with a programmable table storing priority group IDs and a universe table storing all of the group ID codes that can be scanned. In this manner, the scanning sequence is weighted based upon those group ID codes that have been most frequently encountered in the past.

BRIEF DESCRIPTION OF THE DRAWINGS

Further features and advantages will become more apparent from the following and more particular description of the preferred and other embodiments of the invention, as illustrated in the accompanying drawings in which like reference characters generally refer to the same parts or elements throughout the views, and in which:

FIG. 6 is a chart illustrating the hierarchy in the scanning sequence;

FIG. 7 is a flow chart of operations carried out by the mobile radio processor in carrying out the scanning hierarchy of FIG. 6;

FIG. 8 is a flow chart of operations carried out by the mobile radio processor in scanning a reduced set of system ID codes stored in the memory;

FIG. 11 is a simplified flow chart of operations carried out when operating with different types of radio systems; and FIG. 12 is a memory table storing data concerning the different types of radio systems.

DETAILED DESCRIPTION OF THE INVENTION

Figure 1:
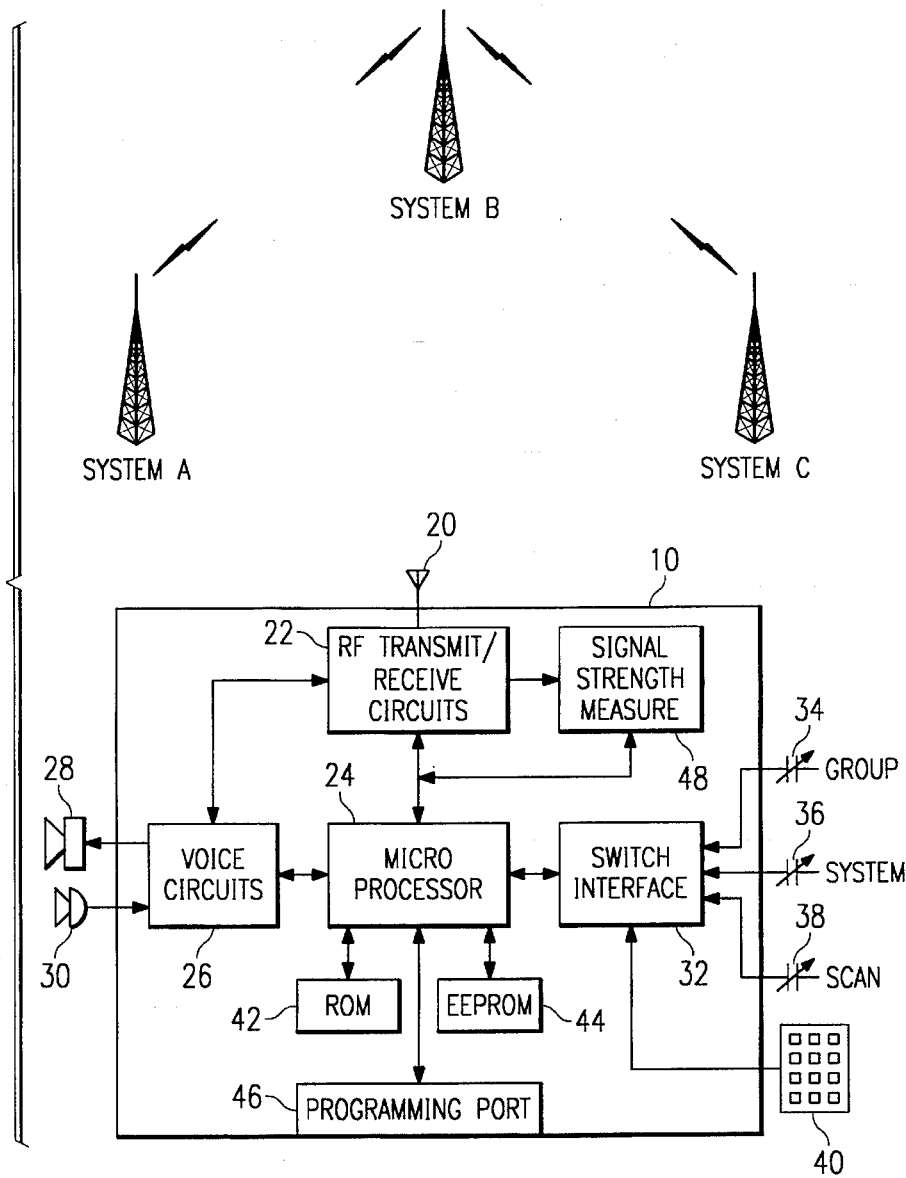
FIG. 1 is a generalized diagram of a mobile radio complex, and illustrating by way of background the incorporation of a mobile transceiver radio embodying the present invention.

FIG. 1 illustrates an environment in which the principles and concepts in the invention can be advantageously practiced. Mobile communication equipment 10, such as a mobile radio or a mobile telephone, is adapted for communicating with numerous systems, such as system A, system B and system C. The communication systems A, B and C are of the type that operate to communicate bidirectional voice or data information. Generally, such systems utilize different transmit and receive frequencies in the 220 MHz or the 800–900 MHz frequency spectrum. The systems are each controlled by a controller (not shown) for coordinating the communications between the mobile equipment 10 and other remotely located mobile equipment or a base station (not shown). As noted above, the systems can operate on the same frequencies if the area of coverage is not overlapping, but must operate on different frequencies if the area of coverage is overlapping. Each communication system is uniquely identified by the transmission of a system identification code on each "home" channel, thereby distinguishing such systems from each other.

Figure 2:
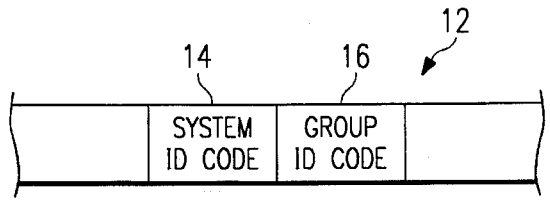
FIG. 2 illustrates a message format in which system and group identification codes are transmitted on a home channel of a mobile radio system.

FIG. 2 illustrates a series of data messages 12 transmitted on a transmit carrier frequency by each system. The data message traditionally includes about 40 bits, with seven bits allocated to a system ID code 14 and thirteen bits allocated to a group ID code 16. The transmission of the entire data message on a home channel takes about 134 milliseconds per message. Circuits in the mobile equipment 10 are adapted to recognize a frame interval in which all 40 bits of the data message are transmitted and decode each of the sections of the data message to provide the system ID code, the group ID code as well as other overhead bits such as sync bits, parity bits, etc. The data message is not limited to these characteristics or format, but can be any other form.

With reference again to FIG. 1, the mobile equipment 10 includes an antenna 20 connected to RF transceiver circuits 22 for allowing the transmission or reception of modulated RF energy. A microprocessor 24 is coupled to the transceiver circuits 22 as well as other circuits for coordinating the operation of all circuits of the mobile equipment 10. While not shown, the transceiver circuits 22 include a programmable frequency synthesizer for tuning circuits therein to receive specified RF frequencies as well as to transmit specified RF frequencies. Conventional voice circuits 26 are coupled to both the transceiver circuits 22 as well as the microprocessor 24. When in the receive mode, the microprocessor allows modulated RF energy to be processed by the transceiver receiver circuits 22 and passed to the voice circuits 26 and to a speaker 28. When in the transmitting mode, voice signals are coupled from the microphone 30 to the voice circuits 26 and therefrom to the transmit circuits 22 to the antenna 20. As noted above, the RF transceiver circuits 22 operate on different frequencies when in the transmit and receive modes. For example, a single mobile radio channel utilized by system B may utilize radio channel 100 that has a transmit frequency of 808.4875 MHz and a receive frequency of 853.4875.

The microprocessor 24 is also connected by way of a switch interface 32 to user actuated switches. For example, the microprocessor 24 can respond to the operation of a group switch 34, a system switch 36, and scan switch 38 or a DTMF keypad 40. The switches may be of the rotary, single contact or momentary type or other type of actuation device suitable for the purpose described herein.

The microprocessor 24 includes an operating program stored in a memory 42 of the read only type. Further, the microprocessor 24 includes nonvolatile, programmable memory 44 of the EEPROM type. As will be described in more detail below, the nonvolatile memory 44 includes the various queues and tables utilized in the scanning sequence of the invention. A programming port 46 is provided on the mobile equipment 10 so that a personal computer (not shown), or the like, can be connected to the mobile equipment 10 to communicate with the microprocessor 24 and program the nonvolatile memory 44. Preferably, the microprocessor 24 is programmed to respond to either modulated data received via the antenna 20 or the programming port 46 for programming the nonvolatile memory 44. A circuit 48 is also provided with the mobile equipment 10 for measuring the signal strength of carrier frequencies received from systems. The signal strength measuring circuits are of conventional design and controlled by the processor 24 to operate in conjunction with the frequency synthesizer for measuring the signal strength of selected frequencies.

Figure 3:
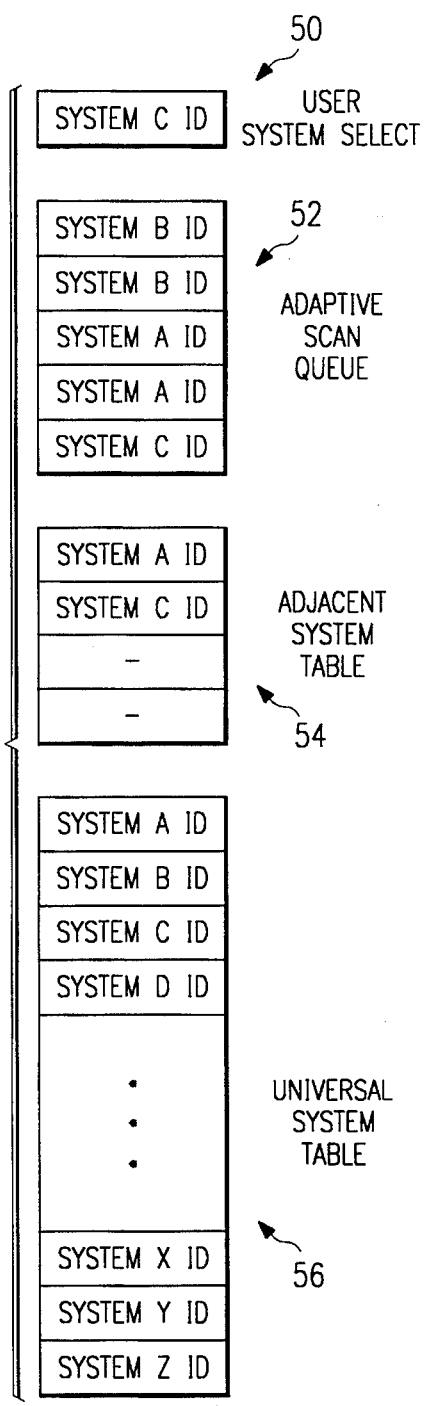
FIG. 3 illustrates an adaptive queue and other scanning tables of the invention.

In the preferred embodiment of the invention, the mobile equipment 10 includes a number of memory locations in the programmable memory 44 for storing identification codes, or related or associated information, that uniquely identifies each system with which it is authorized to operate. With reference to FIG. 3, there are illustrated the various memory locations defining a user switch selection memory location 50, an adaptive scan queue 52, an adjacent system table 54 and a universal system table 56. The organization of the various memory locations may be chosen, as well as the addressing scheme, to accomplish the function described herein. With reference to the universal system table 56, there is illustrated a number of entries for programming therein each and every system within which the mobile equipment 10 is entitled to operate. By reason of contractual arrangement, or otherwise, the mobile equipment 10 of the example is shown to be authorized for operation with respect to 26 different systems, denoted A–Z. The identification codes of the systems A–Z can be programmed into the universal system table 56 via the programming port 46. As additional systems become authorized, the identification codes thereof can also be appended to the universal system table 56. As can be appreciated, the more systems with which the mobile radio can operate, the more time consuming it is to scan all the home channels in a traditional manner. It is to be understood that with each system ID code programmed into the universal system table 56, there is also associated therewith a home channel frequency so that when such channel of the system is to be scanned, the frequency synthesizer in the RF circuits 22 can be selected to configure and tune the circuits thereof to receive that particular frequency.

Also shown is the adjacent system table 54 for programming therein the identification codes of those particular systems that both appear in the universal system table 56 as well as that are geographically adjacent the particular system in which the mobile equipment 10 operates most frequently. For example, if the mobile equipment 10 is associated with the package delivery service that has a base of operation in the geographical area of system B, which is physically adjacent to systems A and C, then the adjacent system table 54 would be programmed with the identification codes of system A and system C. The adjacent system table 54 is not updated dynamically, although it could be. Further, the table 54 is contemplated to be programmed via the programming port 46 of the mobile equipment 10. It is expected that the adjacent system table 54 will include only a few entries.

Figure 4:
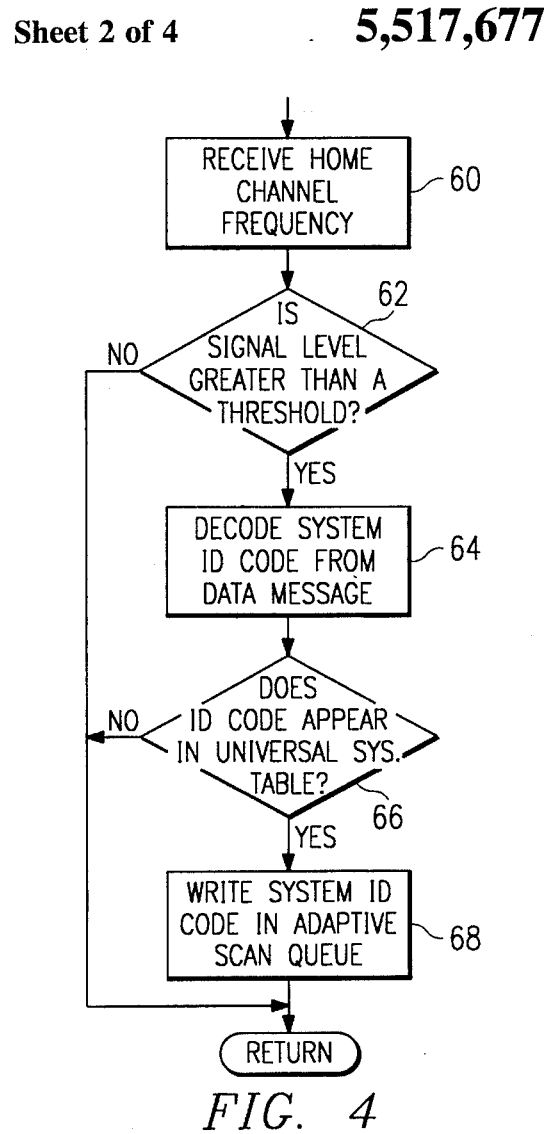
FIG. 4 illustrates a flow chart of processor operations carried out by a mobile radio in programming the adaptive queue of the invention.

In accordance with an important feature of the invention, the programmable memory 44 of the mobile equipment 10 includes an adaptive scan queue 52 that is dynamically programmed with identification codes of those systems with which the mobile equipment 10 has recently communicated. The adaptive scan queue 52 is contemplated to be highly advantageous in applications where the mobile radio 10 is allowed to roam from one geographical location to other locations and yet receive incoming calls at the new locations, all transparent to the user. The roaming feature of the mobile equipment 10 of the invention operates in the following manner, with reference to FIG. 4. The mobile equipment 10 includes a circuit 48 (FIG. 1) for measuring the signal strength of the home channel received, as shown in program flow blocks 60 and 62. On reaching a predefined threshold of the signal strength, which is generally somewhat above a noise level, the microprocessor 24 decodes the system identification code 14. This is shown as program flow block 64. In decision block 66, the microprocessor 24 compares the system ID code received via the antenna 20 with the ID codes in the universal system table 56 to determine if the mobile equipment 10 is authorized to be used with such system. If it is not, program flow returns to normal processing. If, on the other hand, the system ID code appears in the universal system table 56, the microprocessor 24 causes the adaptive scan queue 52 to be written with the ID code. This is shown in program flow block 68. Depending upon the manner in which the adaptive scan queue 52 is organized, program flow block 68 may include instructions for sequentially moving ID codes previously programmed in the queue 52 so that the queue functions as a first-in, first-out type of shift register. In other words, a group of addresses in the programmable memory 44 may be associated with the identification codes so that when the addresses are sequentially generated, the identification codes appear in a sequence much like the operation of a first-in, first-out shift register. Those skilled in the art may prefer to utilize a discrete circuit shift register rather than software for such purposes. The programmed operations shown in FIG. 4 can be carried out as a subroutine that is periodically executed to determine the geographical area of operation of the mobile equipment 10. It is contemplated that both the signal level and the rate will be programmable per system.

Figure 5:
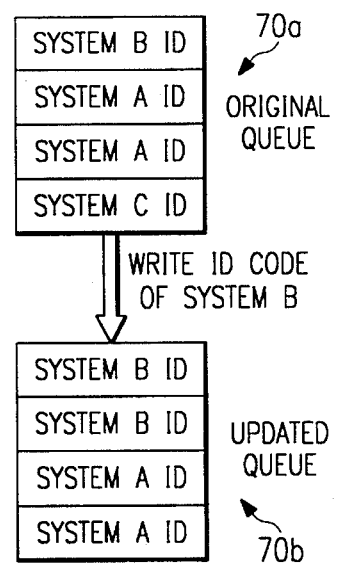
FIG. 5 illustrates the first-in, first-out nature of the programming of the adaptive queue.

FIG. 5 illustrates a four-entry adaptive scan queue 70a at a certain point in time, and the same queue 70b after being dynamically updated. According to the original queue 70a, the ID code of system C was first written, and thereafter the ID code for system A was written followed again by system A, and then lastly by the ID code of system B. This corresponds to a situation in which the mobile equipment 10 first entered the geographical area in which system C was received. Then, the mobile radio moved into the operational area of system A which was sensed twice by the mobile equipment 10. Then, the mobile equipment 10 moved to the operational area of system B, whereupon the ID code was last written in the adaptive scan queue 70a. In the example, assume that after the movement of the mobile equipment 10 that occasioned the writing therein of ID codes according to the queue 70a, the mobile radio then moved to the operational area of system B. The adaptive scan queue 70b is then written with the ID code in queue 70b, and the oldest-written ID code of system C is removed from the queue. The entries of the queue 70b show that based on past history, it is highly likely that the mobile radio will again encounter system A or system B.

The user switch selection memory location 50 has stored therein the identification code corresponding to the system manually selected by the switch 36 (FIG. 1). The memory location 50 is dynamically updated by the microprocessor 24 each time the system switch 36 is changed by the user of the mobile radio. While not shown, each entry of the universal system table 56 may include additional data programmed therein that associates the system ID code with the particular position of the system switch 36. Thus, when the microprocessor 24 senses that the system switch 36 has been repositioned, it can correlate the switch position with the entries of table 56 and use the associated identification code for writing in the user switch selection memory location 50.

An entire scan sequence according to the invention involves a number of traversals, or cycles, through the scan architecture of FIG. 3. It should be noted that the memory 44 need not have sequentially programmed therein the actual sequence shown in FIG. 3, but that the addressing scheme of the memory result in such a scanning sequence. The scan sequence can be better understood by reference to FIG. 3 and FIG. 6. A scan cycle involves the user switch selection entry 50, the accessing of one entry in the adaptive scan queue 52, an access of one entry of the adjacent system table 54, and an access of one entry of the universal system table 56. Thus, a complete scan cycle of a sequence involves the accessing of one entry in the queue 52, and tables 54 and 56. In the next scan cycle, the next entry in each of the adaptive scan table 52, the adjacent system table 54 and universal system table is scanned. Once every entry of the respective queue 52 and the tables have been scanned, the scan for the respective queue or table is repeated starting with the first entry. The cyclical scanning of the queue 52 and each of the tables is dependent solely on the number of entries. It should be understood that those skilled in the art may prefer to omit table 50 and table 54 and resort only to the adaptive scan queue 52 utilized in conjunction with the universal system table 56. Other combinations may be preferred to optimize particular types of environments of operation.

FIG. 7 illustrates a flow chart representing those processor instructions for carrying out the overall scan sequence of the invention. The overall sequence is initiated when the microprocessor 24 enters the scan sequence routine, as illustrated by program flow block 80. The processor 24 initializes all memory pointers so that appropriate addressing of the queue and table locations of the programmable memory 44 can commence. This commences the first scan cycle of the sequence as noted in FIG. 6. The broken horizontal lines in the scan sequence of FIG. 6 illustrate the various entries sequentially read from the various locations of the programmable memory 44. The initialization is shown in program flow block 82. In block 84, the memory location storing the user switch selection indication is accessed. In other words, if the system switch 36 (FIG. 1) is set to system C, then the identification code of system C is read according to program flow block 84. The adaptive scan queue 52 is next read starting with the first location thereof. This is shown in program flow block 86. In scanning the adaptive queue 52, the identification code of system B is read as it is the first entry in the queue. Next, the first entry of the adjacent system table 54 is read, as depicted by the instructions of program flow block 88. In the example, the mobile equipment 10 is accustomed to operating with regard to a home system B, and thus systems A and C are identified as adjacent systems, and were initially programmed into the adjacent system table 54. Only the ID code of system A is read in the first scan sequence according to program flow block 88, as it is the first entry in the table 54.

Proceeding to program flow block 90 of FIG. 7, the first entry of the universal system table 56 is read. In the first traversal through the flow chart of FIG. 7, the address pointer of the universal system table 56 was initialized to point to the first entry, i.e., the system A identification code entry, and thus such entry is read in the first cycle. In program flow block 92, the address pointers associated with the adaptive scan queue 52, the adjacent system table 54 and the universal system table 56 are all incremented so that the second entry of the respective memory locations is selected. Included in the instructions of program flow block 92 are the number of active entries of the queue and the tables so that if incremented beyond an active entry, the pointer is reset to point to the first entry. This allows the cyclical scanning of the active entries. For example, if there are sixteen memory locations allotted to the adjacent system table 54, but only two locations are programmed and thus are active, the cyclical scanning is only between the first and second entries, and the inactive or reset memory locations 3–16 are not scanned. Those skilled in the art may prefer to read more than a single entry of the universal system table 56 during a single cycle, and thus the processor instructions can be programmed to achieve this end. In other words, in a single cycle of the scan sequence, the first two entries of the universal system table 56 can be read, and then in the next cycle, the next two entries can be read, and so on. In this modified scanning technique only 13 scan cycles would be required to complete the access to every entry in the universal system table 56, assuming such table includes the ID codes of systems A–Z. Various other combinations of entries of the table 56 can be realized. The adaptive queue 52 and the adjacent system table 54 can be scanned in a modified manner also to include more than one entry for each scan cycle.

In carrying out these instructions according to program flow blocks 84–92, the microprocessor 24 completes the first cycle of the first scan sequence. The second scan cycle is completed after the pointer is incremented to read the second queue or table entry, or is reset if all the active entries have been read. The remaining scan cycles are carried out until all of the entries of the universal system table 56 have been read, whereupon the processor 24 commences a new scan sequence.

It should be realized that embedded in the instructions of the flow chart of FIG. 7 are other processor functions which, when carried out, cause the actual scanning of the home frequency of the particular system being scanned in the sequence. For example, in the initial accessing of the first entry of the adaptive scan queue 52, the identification code of system B is read from the programmable memory 44. The receive frequency of the home channel of system B is determined, and the microprocessor 24 causes the frequency synthesizer of the RF circuits 22 to be programmed to receive such frequency. Then, the data message 12 is retrieved from the received carrier and decoded from the multiple bits of the data message. The ID code is then compared with the identification code of the mobile equipment 10 to determine if a match exists. If so, then the microprocessor 24 causes a visual or audio indication to be generated so that the user of the mobile equipment 10 is aware of an incoming communication. If no match is found between the decoded identification code and that assigned to the mobile equipment 10, the next system ID code is read according to the scan cycle described above. The foregoing sequence of events is carried out for each system ID code read in the scan cycle.

It should be understood that during a scan sequence, the mobile equipment 10 may have entered into a new geographic area of operation, and thus encountered a new system. In this instance, the adaptive scan queue 52 will be updated according to the operation shown in FIG. 4, and the scan sequence will be modified. Modification of the queue 52 during the scan sequence is shown in FIG. 6 occurring between cycle 4 and cycle 5. In the example, the mobile equipment 10 has been taken from the geographical area associated with system B to the geographical area associated with system D. The identification code of system D was then automatically programmed into the first entry of the adaptive scan queue 52, the old first through fourth entries were moved to the respective second through fifth locations, and the oldest entry, e.g., the ID code of system C in location five has been dropped out of the queue. Nevertheless, the scan sequence shown in FIG. 7 continues to be carried out on the updated queue 52.

It is further noted in FIG. 6 that during an overall scan sequence, the user may switch the manual switch 36 to a new system. In the example, the processor 24 updates the entry 50 concerning the user selected system to reflect that the switch 36 is set to system D rather than system C. The scanning sequence of FIG. 6 shows that between the fifth and sixth scan cycles, the user changed the switch 36 from system C to system D.

FIG. 8 illustrates a simplified scan sequence of a system employing only the adaptive scan queue 52 and the universal system table 56. The scan sequence of this embodiment is initiated by carrying out the instructions of program flow block 100 and initializing the memory pointers according to program flow block 102. In this embodiment, a scan cycle is accomplished by alternately reading entries in the adaptive scan queue 52 and the universal system table 56. In program flow block 104, one entry of the adaptive scan queue 52 is read and the home channel of the associated system is accessed to determine if an incoming message is for the particular mobile equipment 10. After the entry of the queue 52 has been read, one entry of the universal system table 56 is read. This is shown in program flow block 106. The address pointers of the queue 52 and the universal system table 56 are then incremented to allow the next entry of the respective queue and table to be read. This is shown in program flow block 108. This sequence is continually repeated to ascertain if an incoming message has been received. In this embodiment, the weighting of the entries of the adaptive scan queue 52 is less than that of the technique described in conjunction with the FIG. 7 technique.

In comparing the cyclical scanning technique of FIG. 7 with regard to that of FIG. 8, it can be appreciated that the weighting of accessing the home channels of those systems written into the adaptive scan queue 52 may be significantly skewed toward such systems. For instance, neglecting the scanning of the table entries 50 and 54 in the FIG. 3 embodiment, the systems programmed into the adaptive scan queue 52 are accessed more times for a full traversal of the universal system table 56, as the queue 52 is anticipated to include fewer active entries than the table 56. Further, if systems appear plural times in the adaptive scan queue 52, then the skewing toward such systems is even more dramatic. On the other hand, in utilizing the FIG. 8 embodiment, the systems programmed into the adaptive scan queue 52 are accessed at least twice for each complete traversal of the universal system table 56. The systems that are scanned twice are scanned early in the sequence in the adaptive scan queue 52, and then again when the universal system table 56 is scanned. If a system ID code appears twice in the adaptive scan queue 52, then it will be scanned three times in an overall scanning sequence.

As noted above, the extent of the skew can be controlled by reading plural entries of the universal system table 56 for each cyclic traversal through such table. In view of the foregoing, the size of the adaptive scan queue 52, i.e., the total number of entries programmable therein, can be varied to adjust the weighting factor resulting from the use of such a queue. It is contemplated that the size of the queue can be controlled or programmed by the microprocessor 24 to optimize performance of the mobile equipment 10, based upon the activity of the user thereof. The smaller the size of the adaptive scan queue 52, the less the most recent entries therein are weighted. Further, a small-sized adaptive scan queue 52 is faster at being adaptive as the user moves around various areas. On the other hand, the larger the size of the adaptive scan queue 52, more weight is given to the most recent entry therein. A long adaptive scan queue 52 with many entries will be sluggish as the user of the mobile equipment 10 moves between various systems. Stated another way, a large adaptive scan queue 52 requires more time to accomplish the overall scan sequence, and thus various systems programmed into the universal system table 56 are less frequently accessed, as compared to a small queue 52. Therefore, if the user of the mobile equipment 10 is expected to visit only a relatively small number of systems, then the number of entries of the adaptive scan queue 52 can be somewhat large. On the other hand, if the user of the mobile equipment 10 is likely to roam about a substantial number of systems, such as a salesman, then the adaptive scan queue 52 should be programmed to accommodate only a small number of entries. In practice, it has been found that a number of entries of the adaptive scan queue 52 may range from about four to sixteen and still maintain an adequate response with respect to those systems that are infrequently utilized.

The size of the adaptive scan queue 52 can be initially programmed into the mobile equipment 10 via the programming port 46. To that end, there is initially programmed in the mobile equipment 10 a parameter that defines the length of the adaptive scan queue 52. For example, in response to an input menu, if the parameter "6" is appropriately programmed into the microprocessor 24 in association with the adaptive scan queue 52, the addressing scheme for the queue 52 will only generate six addresses corresponding to six entries. After the six entries have been read, no further matter will be read from the adaptive scan queue 52 irrespective of the number of memory addresses allocated to the queue. The programmable length parameter can also be changed from time to time by reprogramming the parameter with a different number. The parameter programmed into the mobile equipment 10 is utilized during reading as well as writing of the adaptive scan queue 52. Hence, the same number of entries are read as are written, thus reflecting or weighting those systems that are more frequently encountered by the mobile equipment 10. By utilizing the adaptive scan queue 52, the home channels of those systems more frequently encountered are scanned early in the sequence, and more often, thereby yielding the highest priority of obtaining communications in a short period of time.

Figure 9:
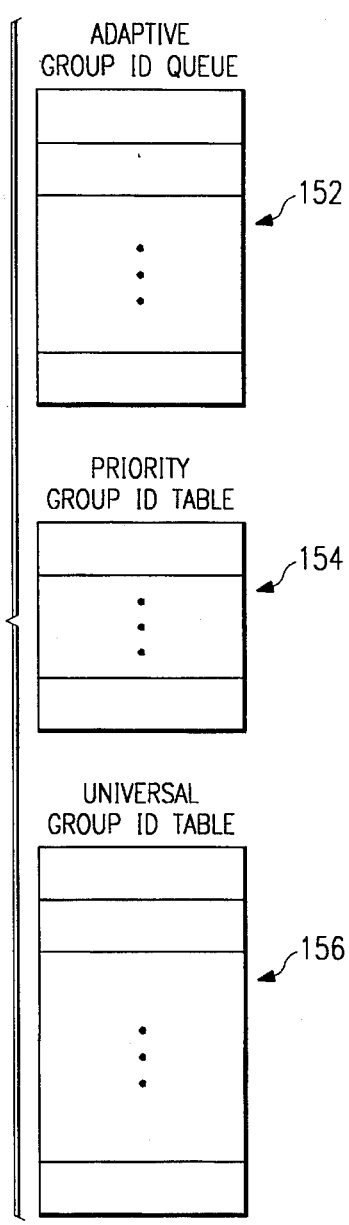
FIG. 9 is a diagram illustrating a programmable queue and associated tables adapted for scanning group ID codes.

The foregoing illustrates the scanning of system identification codes and the use of the various tables for storing such codes. A similar technique can be utilized for scanning group identification codes, rather than system identification codes. With reference to FIG. 9, there is shown a system of tables for storing group identification codes for use in scanning. Mobile communication equipment, and especially mobile radios, often utilize a number of groups in association with a system. Each group generally has a community of interest as distinguished from other groups associated with the system. For example, a single communication system may have one customer group that is involved with a courier delivery service, another customer group involved in maintenance personnel, another group involved in police enforcement, etc. Each group is distinguished from the other groups by different group identification codes 16 (FIG. 2) that are transmitted in the data message 12 of the home channel of the system. The group identification codes 16 are programmed into the mobile radios and thus the particular mobile radios will only respond to the data messages containing those group identification codes. Hence, each group cannot generally intercommunicate with each other, unless they share the same group identification codes. The scanning of group identification codes to detect incoming calls involves the same problems as noted above in connection with the scanning of system identification codes. Accordingly, the adaptive scan queue described above in connection with the system identification codes can also be employed with group identification codes. Referring now to FIG. 9, there is shown an adaptive group ID queue 152, a priority group ID table 154 and a universal group ID table 156. The group ID queue 152 is adaptive, in that each time the mobile equipment 10 receives an incoming call associated with a group ID, such ID is automatically written by the microprocessor 24 into the queue 152. Again, the queue 152 can be of any length, and particularly is programmed to a specific length, although the length can be changed. The adaptive queue 152 is of a first-in, first-out type, and is written and read in the same manner described above in connection with the adaptive scan queue 52 (FIG. 3).

The priority group ID table 154 is similar to the adjacent system table 54 (FIG. 3), and is externally programmed with those group identification codes having a high priority in terms of those that are highly likely to be used by the mobile equipment 10o The universal group ID table 156 stores a listing of all group identification codes that are usable in connection with the mobile equipment 10. As with the universal system table 56, the group ID table 156 stores an exhaustive listing of all the group identification codes that the mobile equipment 10 is authorized to use.

The scanning sequence of the group identification tables is carried out by accessing the first entry of the group ID queue 152, then accessing the highest priority group ID code in the table 154, and then the first group identification code in the universal table 156. In the second scan, the second entry of the adaptive queue 152 is accessed, and then the highest priority of the priority table 154 is again accessed, and then the second group ID code in the universal table 156 is accessed. All entries in the universal table 156 are accessed before the next priority group ID code in the table 154 is accessed. Hence, for each scan cycle, and assuming the queue 154 is smaller than the table 156, the group ID queue 152 is fully accessed one or more times, and only a single entry of the priority table 154 is accessed for each traversal through the universal group ID table 156. For each scan cycle, a different entry of the universal table 156 is accessed, but a different group ID code in the priority table 154 is accessed only after every entry in the universal table 156 has been accessed.

The same advantages accrue to the use of the adaptive group ID queue 152, in that each time the user of the mobile equipment 10 initiates or receives communications from another group, that group identification code is automatically written into the queue 152. Hence, by writing and scanning such a queue in the manner noted, the probabilities of achieving communications more quickly is achieved.

Much like the system scan technique, the group scan technique can be accomplished without the use of the priority table 154. Further, scanning between the various tables in the queue can be modified to achieve yet other efficiencies.

The primary purpose of scanning communication channels for group IDs is to determine whether an incoming call is being forwarded to the particular mobile equipment 10. Hence, if it were known in advance where a mobile unit 10 was physically located in terms of a specific system, there would be no need for the unit 10 to scan the various channels for a particular group ID code. In accordance with another feature of the invention, there is disclosed a technique for providing communications between a mobile unit 10 and the particular system with which it is presently in communications, so that the overall system complex knows the exact geographical location of the mobile unit 10. With such a system, because it is known where the mobile unit 10 can be found in the multi-system complex, there is no need to scan incoming group identification codes to ascertain if a message is imminent.

Figure 10:
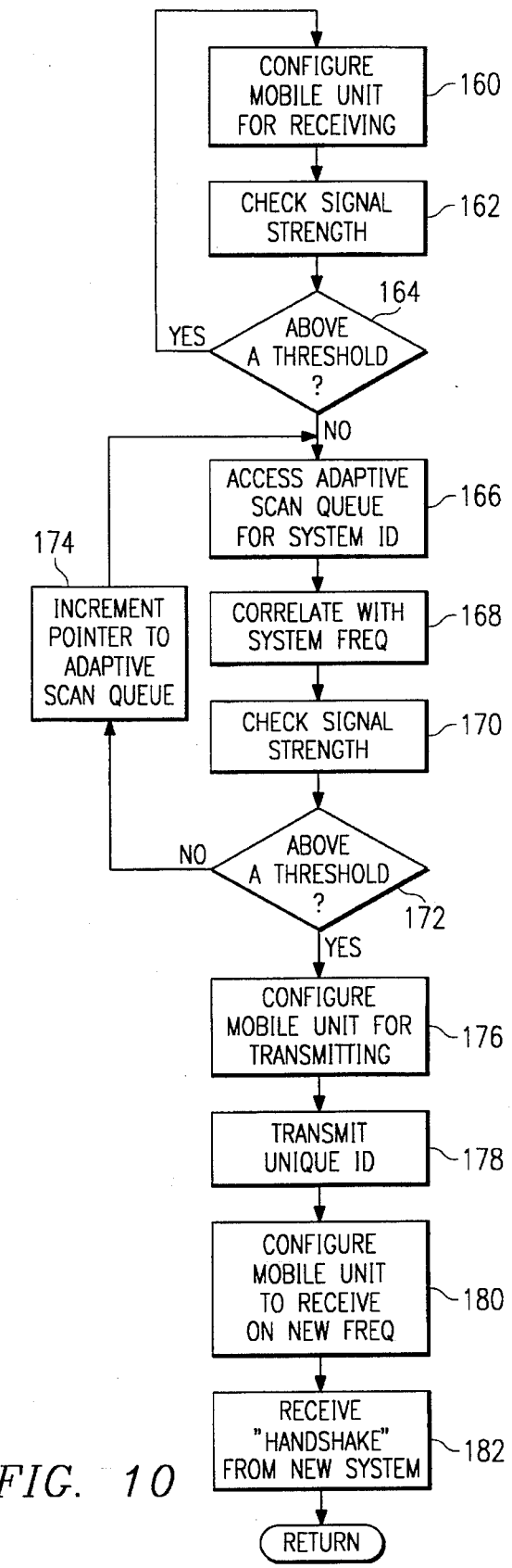
FIG. 10 is a flow chart of processor operations that are carried out in a roaming function.

The flow chart of FIG. 10 illustrates communications between a mobile unit 10 and a communication system for establishing the geographical location of the former when roaming. Flow chart block 160 illustrates those program steps in the mobile unit 10 for configuring the unit as a receiver for receiving the home channel of the system with which it is presently in communications. In block 162, the microprocessor 24 of the mobile unit 10 activates the signal strength measuring circuit 48 for measuring the signal strength of the carrier of the home channel. In decision block 164, the microprocessor 24 determines if the signal strength of the carrier is above a predefined threshold. If the decision is in the affirmative, then processing is returned to block 160 where the signal strength of the home channel carrier is monitored. On the other hand, if it is determined in decision block 164 that the signal strength of the home channel is below a predefined threshold, processing continues to block 166 where the adaptive scan queue is accessed to identify the first system identification code. The adaptive scan table is utilized as there is a high likelihood that the closest system to the mobile unit 10 is one in which the user has previously communicated with, and thus the ID code is stored in the queue 52. Proceeding to program flow block 168, the microprocessor 24 correlates the ID code of the system in the queue with a frequency for receiving communications on a home channel with the system. In program flow block 170, the signal strength of the home channel of the new system is ascertained, again using the signal strength measuring circuit 48. Decision block 172 determines whether the signal strength of the new home channel is above a threshold, and if not, the pointer to the adaptive scan queue is incremented, as noted by program flow block 174. Return is then made to the input of program flow block 166 where the next system ID code of the queue is accessed, a corresponding home channel frequency is ascertained, and the signal strength thereof is measured. This loop continues until a home channel of a system is found that exceeds a predefined threshold, whereupon processing proceeds to block 176. In executing the instructions according to this block, the microprocessor 24 configures the mobile unit 10 for transmitting on a frequency associated with the system found to operate on a home channel carrier exceeding the predefined threshold. In program flow block 178, the mobile unit 10 transmits a unique identification code associated therewith to the new system. In program flow block 180, the mobile unit reconfigures itself as a receiver to receive on the home channel of the new system. In program flow block 182, the mobile unit 10 monitors the home channel frequency of the new system to receive an acknowledgement or "handshake", indicating that the new system has registered the existence of the mobile unit 10. Once the handshake is received by the mobile unit 10, it maintains monitoring of the new home channel to receive all incoming messages directed to the unit. In this manner, the mobile unit 10 does not need to scan the various identification codes of the home channels of the various systems to determine if a message is incoming. After the processing of the instructions according to program flow block 182, the mobile unit 10 maintains monitoring of the new home channel for signal strength as well as for receipt of the unique identification code of the unit.

In such a system as described, the various communications systems are preferably interconnected with each other to define a network. The interconnection can be by way of land lines, satellite, or other communication channels for allowing the transfer of information between the various systems. Indeed, the systems can be interconnected by way of the public telephone system so that a single mobile unit 10 can roam within the geographical area of the network of interconnected systems. In such a network, it is contemplated that messages will be routed using a store and forward packet switched data network.

In accordance with another feature of the invention, the mobile unit 10 can be programmed with data, flags or indicators associated with each system that indicates the specific type of system. In other words, some systems may not be equipped with equipment for accomplishing the handshake described above and thus must be used in connection with group identification codes. As noted above, other types of systems equipped with the handshake capabilities do not need to be scanned with respect to the various group ID codes. By being able to distinguish between the various types of systems, the mobile unit 10 does not have to carry out the group ID scanning functions when in communication with a system that can ascertain and register the whereabouts of the mobile unit 10. However, the mobile unit 10 is yet required to carry out the group ID scanning function with the traditional type of systems so that an incoming call or message is not missed.

With reference now to FIG. 11, there is shown a simplified operational sequence programmed into the memory of the microprocessor 24 for configuring itself in accordance with the type of system with which it is presently operating. According to program flow block 200, the microprocessor 24 identifies the new system with which it is operating according to the program flow carried out in accordance with FIG. 10. Each system is uniquely identified by an identification code 14 transmitted in its home channel. In program flow block 202, the microprocessor 24 determines the type of system with which it is operating, i.e., whether the system in the mobile unit can intercommunicate by way of the handshake, or whether the system is of the traditional type in which the group ID codes of various systems must be scanned. The type of system is determined by consulting a table such as shown in FIG. 12. The table of FIG. 12 is initially programmed into the ROM memory of the mobile unit 10, and associates with each system an indication of whether it can accomplish a handshake, or not. As noted in FIG. 12, system A and system B are associated with a type "0" while system C is associated with a type "1" designator. While the designation is arbitrary, in the example systems A and B are of the handshake type, and system C is of the traditional type. After determining the type of system with which the mobile unit 10 is presently operating, program flow block 204 is encountered, whereupon the mobile unit 10 reconfigures itself to scan for group IDs if it is a type "1" system, or configures itself in the roaming mode if it is operating with a type "0" system. If the new system found pursuant to the operations of the flow chart of FIG. 10 is found to be a type "0" system, then the group ID scanning technique or circuits are disabled. On the other hand, if the system with which the mobile unit 10 is presently operating is of a type "1", the scanning of group identification codes is carried out in a manner described above. By selectively configuring the mobile unit 10 according to the particular type of system with which it is operating, the efficiency of the unit is significantly improved.

From the foregoing, disclosed is apparatus and corresponding techniques for expediting initiation of communications between originating and destination equipment. The adaptive queue according to the invention is implemented in a scanning sequence to weight the scanning of certain entries so that those systems with which the mobile unit has communicated in the recent past are scanned first. By modifying the scanning sequence in this manner, the time in which communications are established is generally reduced. While the foregoing techniques and other embodiments have been disclosed with regard to mobile radio equipment, the invention is not to be limited to such a field. For example, the principles and concepts of the invention and as appearing in the claims appended hereto are applicable to mobile telephones, paging devices, computer networks and other electronic equipment where the scanning of sequential accessing of a number of entries is made in order to determine a condition. Thus, while the invention has been disclosed with reference to a specific communication system, it is to be understood that many changes in detail may be made as a matter of engineering or programming choices, without departing from the spirit and scope of the invention as defined by the appended claims.

What is claimed is:

1. A method for arranging plural elements of an array of elements to facilitate determining if an element has an attribute, comprising the steps of:

receiving the element in a process a first time and using the element in completing the process the first time, and in response to the use of the element in the process, storing an identity of the element in a queue;

identifying each said element of the array and storing respective identities of all said elements in a table; and carrying out the process a second time by accessing the identities of the elements in the queue and accessing the identities of the elements in the table to determine if any said accessed element has said attribute, wherein an overall sequence is carried out when each said element is accessed at least once, whereby the identities of the elements as stored in the queue are accessed at least twice in the overall sequence.

2. The method of claim 1, further including accessing the queue before accessing the table to facilitate finding an element in the queue having said attribute.

3. The method of claim 2, further including alternately accessing element identities in the queue and element identities in the table.

4. The method of claim 2, further including storing fewer element identities in the queue than in the table.

5. The method of claim 1, further including storing in said queue identities of elements that have been found prior to said accessing to have had said attribute.

6. The method of claim 5, further including deleting an element from the queue each time a new element identity is stored therein.

7. Scanning apparatus for carrying out the steps of claim 1; comprising:

an addressable memory defining said queue for storing the identity of the element; and a processor coupled by one or more buses to said addressable memory and programmed to carry out said receiving step and said identifying step and the step of carrying out the process the second time.

8. A method of scanning plural communication channels to identify an attribute of one or more said channels, comprising the steps of:

storing in a programmable queue an identity associated with at least one communication channel determined previously to have said attribute;

storing in a universal table an identity associated with each said communication channel available for carrying out a communication, whereby the identities stored in the programmable queue are also stored in the universal table; and in response to an access of the communication channel having the attribute, accessing said programmable queue and said universal table in an overall sequence where each said communication channel is accessed at least once, whereby each said communication channel identity stored in said programmable queue is accessed at least twice in said overall sequence.

9. The method of claim 8, further including carrying out said overall sequence to determine if the attribute defined in an incoming message is associated with one or more communication channels.

10. The method of claim 8, further including alternately scanning communication channel identities in the programmable queue and in the universal table.

11. The method of claim 8, further including storing in a priority table identities of communication channels with which a priority is associated, and scanning the priority table in the overall sequence with said programmable queue and said universal table.

12. The method of claim 10, further including scanning the communication channel identity in the programmable queue for each time a single communication channel identity is scanned in the universal table, and scanning each said communication channel identity of the universal table for each time the single communication channel identity is scanned in the priority table.

13. The method of claim 8, wherein said programmable queue is of a predefined size, and further including writing identities of the communication channels in the queue in a first-in, first-out manner.

14. The method of claim 13, further including changing the size of the programmable queue by changing the number of entries that can be written with channel identities.

15. Scanning apparatus for carrying out the steps of claim 8; comprising:

an addressable memory defining said programmable queue in which said identity of at least one said communication channel is stored;

said addressable memory for storing said universal table; and a processor coupled by one or more buses to said addressable memory and programmed for accessing said addressable memory according to said accessing step.

16. In a communication radio, a method of scanning plural communication channels, comprising the steps of:

storing in a programmable queue only identity codes associated with the communication channels that have experienced actual use by the communication radio during an established voice communication to provide a preferential list of the identity codes, said queue having a size that is insufficient to store the identity codes of all said communication channels usable with said communication radio; and programming a processor to scan all the identity codes of the programmable queue and to scan remaining usable channel identities to complete an overall scan sequence, where each said communication channel identity is scanned at least once in the overall scan sequence of the programmable queue and the remaining usable channel identities.

17. The method of claim 16, wherein system identification codes are stored in said queue.

18. The method of claim 16, wherein group identity codes are stored in said queue.

19. The method of claim 16, further including scanning the identity codes that are stored in the queue at least twice to complete an overall scan of all said usable identity codes.

20. The communication radio for carrying out the steps of claim 16 comprising:

an addressable memory defining said programmable queue in which the identity codes of the communication channels are stored; and said processor coupled by one or more buses to said addressable memory and programmed for accessing said addressable memory according to said programming step.

21. A method of scanning mobile radio channels, comprising the steps of:

providing in a mobile radio a programmable history queue operable in conjunction with a channel scanner in said mobile radio:

programming said history queue with information each time the mobile radio is associated with a different geographical area of operation, said information programmed in said history queue relating to communications in said different geographical area of operation;

if the history queue is full during programming thereof with new information, deleting oldest information previously written therein;

accessing the history queue in a sequential order starting with the newest information written therein and proceeding toward an oldest programmed information; and using the information read from the history queue during accessing by said channel scanner to provide a higher probability of selecting new channels associated with the programmed geographical location information read from the history queue.

22. The method of claim 21, further including writing the history queue in a first-in, first-out manner.

23. The method of claim 21, further including automatically programming the history queue of the mobile radio each time the mobile radio enters the different geographical area of operation.

24. The method of claim 21, further including measuring a signal strength of a carrier to determine which geographical location information should be written into the queue.

25. The method of claim 21, further including programming communication system identity codes in the queue.

26. The method of claim 21, further including communicating with a communication system in a new area of operation by transmitting an identity code of the mobile radio to the communication system and receiving by the mobile radio an acknowledgement, whereby when the communication system receives a message directed to the mobile radio, the communication system transmits the identity code of the mobile radio in association with said message.

27. A mobile communication unit, comprising:

transceiver equipment for receiving and transmitting communication information with a plurality of destinations, each destination associated with an identity code;

a memory for storing programmed instructions;

a processor for carrying out said programmed instructions;

a memory queue for storing preferred identification codes based on prior actual use thereof by the mobile communication unit in establishing voice communications and said memory queue being scanned by said processor in establishing communications with selected ones of said plurality of destinations, said memory queue storing fewer than all the identity codes associated with the respective destinations; and said processor is programmed to scan the memory queue in a scanning sequence and is programmed to scan a remainder of the identity codes, whereby expedited establishment of communications is realized.

28. The mobile communication unit of claim 27, wherein said processor is programmed to automatically update said memory queue with new identification codes.

29. The mobile communication unit of claim 28, further including updating the memory queue by entering an identity code multiple times therein.

30. The mobile communication unit of claim 27, wherein said memory queue is programmed with identity codes of radio systems with which the communication unit is operable.

31. The mobile communication unit of claim 27, wherein said memory queue is programmed with group identity codes.

32. The mobile communication unit of claim 27, further including a universal memory table for storing all identity codes of a set therein.

33. The mobile communication unit of claim 27, further including storing in the memory an identification code manually selectable by a manual switch of the communication unit, and scanning the identification code selected by the manual switch.

34. The mobile communication unit of claim 27, further including an adjacent system table in said memory, said adjacent system table storing identification codes related to geographical data.

35. The mobile communication unit of claim 27, further including:

at least one memory location in said memory for storing an identity code of a destination selected by a user selectable switch of the mobile communication unit;

at least one memory location in said memory for storing an identity code of a destination that is adjacent a system with which the communication unit frequently operates; and a plurality of memory locations in said memory for storing substantially all the identity codes of all the destinations with which the communication unit is operable.

* * * * *